(12) United States Patent
Noda et al.

(10) Patent No.: US 6,844,859 B2
(45) Date of Patent: Jan. 18, 2005

(54) LOOP ANTENNA, LOOP ANTENNA SYSTEM AND WIRELESS COMMUNICATION SYSTEM

(75) Inventors: Ryuzo Noda, Miyazaki (JP); Taiga Matsushita, Tokyo (JP); Yuichi Iwakata, Warabi (JP)

(73) Assignees: Lintec Corporation (JP); C.D.N. Corporation (JP)

( * ) Notice: Subject to any disclaimer, the term of this patent is extended or adjusted under 35 U.S.C. 154(b) by 0 days.

(21) Appl. No.: 10/293,928

(22) Filed: Nov. 14, 2002

(65) Prior Publication Data

US 2003/0139163 A1 Jul. 24, 2003

(30) Foreign Application Priority Data

Nov. 30, 2001 (JP) ........................................ 2001-365749

(51) Int. Cl.[7] .......................... H01Q 11/12; G08B 13/14
(52) U.S. Cl. .......................... 343/744; 340/572; 343/742
(58) Field of Search ................................ 343/742, 867, 343/788, 744, 866; 340/572; 342/22, 42

(56) References Cited

U.S. PATENT DOCUMENTS

| | | | | |
|---|---|---|---|---|
| 5,270,717 A | * | 12/1993 | Schuermann | ................ 342/22 |
| 5,914,692 A | * | 6/1999 | Bowers et al. | ............... 343/742 |
| 6,204,819 B1 | * | 3/2001 | Hayes et al. | ................. 343/702 |

* cited by examiner

Primary Examiner—James Vannucci
(74) Attorney, Agent, or Firm—Lorusso, Loud & Kelly

(57) ABSTRACT

A loop antenna is constructed by bending a linear conductor so that it forms concavo-convex portions within an antenna plane. As an example, the shape of the loop antenna comprises a long straight line portion (LP) which elongates substantially straight in the direction of the arrow X, a short straight line portion (TP1) which is at a predetermined angle ($\theta 1$) with respect to the long straight line portion (LP) and shorter than the long straight line portion (LP), and a short straight line portion (TP2) which is at a predetermined angle ($\theta 3$) with respect to the short straight line portion (TP1) and at a predetermined angle ($\theta 2$) with respect to the long straight line portion (LP) and has approximately same length as the short straight line portion (TP1), wherein an acute angle portion (TG1) which is formed by the short straight line portions (TP1) and (TP2), and acute angle portions (TG2, TG3 and TG4) each having approximately same shape as the acute angle portion (TG1) are succeeding in the opposite direction of the arrow X to the vicinity of a feeding point (P2).

3 Claims, 2 Drawing Sheets

A LOOP ANTENNA OF THE PRIOR ART.

A LOOP ANTENNA SYSTEM IN WHICH TWO LOOP ANTENNAS ARE COMBINED

A CD CASE TO WHICH AN IC TAG IS ATTACHED.

LOOP ANTENNA, LOOP ANTENNA SYSTEM AND WIRELESS COMMUNICATION SYSTEM

FIELD OF THE INVENTION

This invention relates to a wireless communication system, for example, suitable for use in wireless communications with a small-sized communication device such as a tag device at a relatively short distance by way of an inductive electromagnetic field.

This invention also relates to a loop antenna system as a component of such a wireless communication system.

This invention further relates to a loop antenna as a component of such a wireless communication system.

BACKGROUND OF THE INVENTION

In the inventory control of products such as rental videos or CDs (compact discs), it is expected to identify, by using an RFID (radio frequency identification) system, the presence of video products or CD products which are placed on the product shelves.

In the RFID system, an IC tag card is attached to, for example, a package which wraps a video product or CD product and a loop antenna is installed on a product shelf on which the product is placed. Typically, the shape of the product shelf loop antenna is substantially rectangular as shown in FIG. 2.

The IC tag card is, for example, an integrated circuit comprising a thin, small film antenna coil, and communicates with the product shelf loop antenna which is installed on the product shelf by way of an inductive electromagnetic field by using the antenna coil.

However, for a better communication by way of the inductive electromagnetic field, it is desirable to place the antenna plane of the antenna coil of the IC tag card in parallel, or at least it is necessary to place it obliquely, with respect to the antenna plane of the product shelf loop antenna, such that the most possible numbers of magnetic fluxes which are generated from the product shelf loop antenna cross the antenna plane of the antenna coil. This is because if the antenna planes of the both loop antennas are perpendicular to each other, extremely small numbers of magnetic fluxes intersect thereby sufficient communication cannot be done.

In the case of a cube having a relatively large size in length, width and height such as a package of a video product, it is easy to attach an IC tag card to such as the bottom face of the cube, the surface which will be parallel with the product shelf when placed on the product shelf. However, in the case of a cube having a small size in length, width and height such as a case wrapping a CD product or DVD product, it is typically difficult to attach an IC tag to the bottom face of the cube which will be parallel with the product shelf, since the IC tag card itself has a certain degree of two-dimensional size. A need has arisen for implementing a product inventory control by an RFID system wherein an IC tag card can be attached to a product, even to such a small product.

SUMMARY OF THE INVENTION

In order to solve such problems, a loop antenna of the present invention is characterized in comprising a linear conductor which is bent to form concavo-convex portions within an antenna plane.

In addition, a loop antenna system of the present invention is characterized in comprising the steps of preparing a plurality of the loop antenna of claim 1, placing each loop antenna within a same antenna plane and placing the loop antennas such that the loop antennas are staggered not to overlap within the antenna plane.

The loop antenna system of the present invention is further characterized in that the loop antenna system of claim 2 comprises a feed control means for implementing the feedings to each loop antenna such that the feedings do not overlap in terms of time.

In addition, a wireless communication system of the present invention is characterized in comprising the steps of preparing either one of a loop antenna of claim 1 or a loop antenna system of claim 2 or 3, and preparing an antenna coil whose antenna plane is facing perpendicularly with respect to the antenna plane of the loop antenna or loop antenna system, and implementing wireless communication between the loop antenna or loop antenna system and the antenna coil by way of an inductive electromagnetic field.

DETAILED DESCRIPTION OF THE PREFERRED EMBODIMENTS (A) First Embodiment

An embodiment of the present invention will be now described in an example where a loop antenna, loop antenna system and wireless communication system according to the present invention are applied for the loop antenna, loop antenna system and wireless communication system for an IC tag card.

(A-1) Configuration and Operation of the First Embodiment

Figure 1:
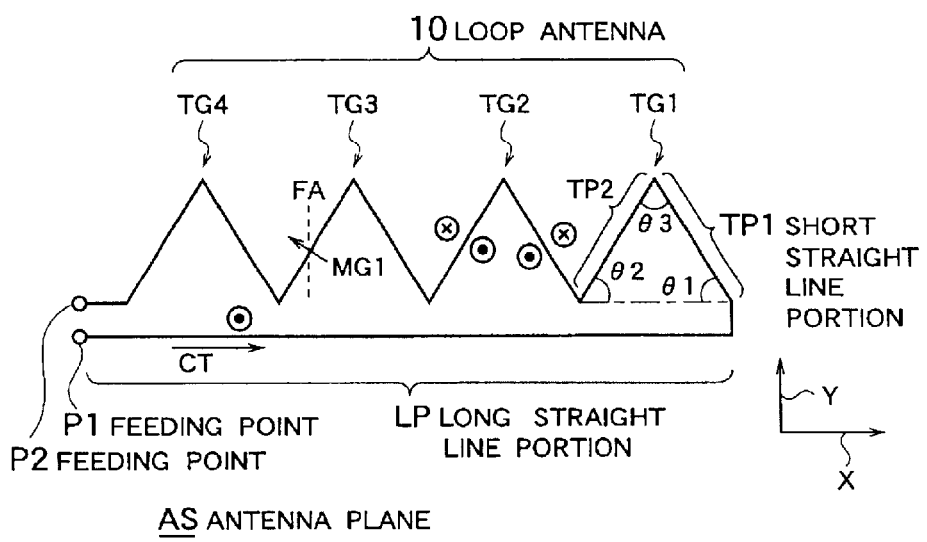
FIG. 1 is a plane view illustrating a schematic configuration example of a loop antenna according to the first embodiment of the present invention.

Although various shapes of loop antenna can be used in the present invention, the shape of the loop antenna shown in FIG. 1 is used as an example in this embodiment. This is a component which is equivalent to the aforementioned product shelf loop antenna.

In FIG. 1, a loop antenna 10 has a substantially saw tooth-shape in its entirety and has feeding points, points P1 and P2.

More specifically, the loop antenna 10 comprises a long straight line portion LP which elongates substantially straight in the direction of the arrow X, a short straight line portion TP1 which is at an angle of θ1 with respect to the long straight line portion LP and shorter than the long straight line portion LP, and a short straight line portion TP2 which is at an angle of θ3 with respect to the short straight line portion TP1 and at an angle of θ2 with respect to the long straight line portion LP and has approximately same length as the short straight line portion TP1, wherein an acute angle portion TG1 which is formed by the short straight line portions TP1 and TP2, and acute angle portions TG2, TG3 and TG4 each having approximately same shape as the acute angle portion TG1 are succeeding in the opposite direction of the arrow X to the vicinity of the feeding point P2.

Although the angles θ1, θ2 and θ3 are indicated approximately same angles in FIG. 1, it is not necessary that they are same.

In addition, although the repeat count of the acute angle portions (such as TG1) is four times (concave portions are three) in FIG. 1, they may be more or less than four times as occasion demands. However, preferably the repeat count is more than twice.

In FIG. 1, the loop antenna 10 has a two-dimensional shape, and the plane of the loop antenna 10 is an antenna plane AS.

Figure 4:
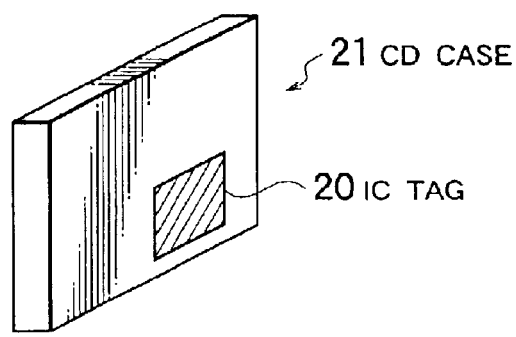
FIG. 4 is a schematic diagram illustrating an example of attaching an IC tag which can be used in the first and second embodiments of the present invention.

In a practical implementation where the loop antenna 10 is installed such as beneath a product shelf, a placing surface which is the obverse side of the product shelf and on which products such as a CD case 21 shown in FIG. 4 are placed (it is desirable that the material of the placing surface is not the material which insulates a magnetic field nor a material which is easily magnetized) is parallel with and also stay close to the antenna plane AS. Therefore, it is desirable to decide the repeat count of the acute angle portions (such as TG1) according to the length of lengthwise direction of the product shelf (which is typically the direction in which such as the CD case 21 is placed).

In this embodiment, the principle that the loop antenna 10 communicates wirelessly with an antenna coil embedded in an IC tag card 20 (see FIG. 4) is the use of so-called inductive electromagnetic field (among it, mainly magnetic field). It is known that the strength of the electromagnetic field in an inductive electromagnetic field equals to the value inversely proportional to the square of the distance from an electrical microdipole to an observation point, and weakens considerably rapidly as the distance increases (this change is slower than that in the electrostatic field but rapider than in the radiation field). Assuming that an electrical microdipole is the loop antenna 10 and an observation point is the antenna coil of the IC tag card 20, it is necessary that the film loop antenna and the loop antenna 10 should be considerably close each other in order to communicate by way of an inductive electromagnetic field.

The sizes in thickness, diameter and width of the linear conductor which forms the loop antenna 10 are not specifically limited. The material of the linear conductor may be any material which conducts electricity. Preferably a metal such as copper or silver is used. In addition, it can be coated with a thin insulator layer.

Although the configuration of the IC tag card 20 can be various configurations, as an example, the use of the existing product which is thought to be appropriate for this application is assumed here. While the number of turns of said loop antenna 10 is one, the antenna coil of this product is a rectangular spiral having multiple numbers of turns in a plane.

In sending signal from the loop antenna 10, if an electric current CT is fed to flow in the direction of arrow X as shown in FIG. 1, a magnetic field perpendicular to the antenna plane and in the direction from the backside to the obverse side of the antenna plane is generated inside of the loop and a magnetic field in the direction from the obverse side to backside of the antenna plane is generated outside of the loop, obeying the right-handed screw rule. This occurs similarly at the long straight line portion LP and also at the acute angle portions TG1–TG4. If the direction of the electric current CT is reversed, the directions of the magnetic field are also reversed. When the magnetic field crosses the aforementioned antenna coil, the signal which is sent from the loop antenna 10 is received by the IC tag card 20.

On the other hand, when the antenna coil of the IC tag card 20 sends a reply signal to the above mentioned reception, it is possible to identify the reply signal at a communication circuit (not shown) of the loop antenna 10 depending on the electromotive force generated at the loop antenna 10 mainly by crossing its magnetic field. Needless to say, the detection and identification of the reply signal are done by a demodulation circuit or decode circuit which may be connected to the feeding points P1 and P2 but not shown.

In the case of the product inventory control of the CD product 21 shown in FIG. 4, the content of the reply signal may be, for example, a CD title or an ID assigned to each IC tag card (identification information of the IC tag card).

Figure 2:
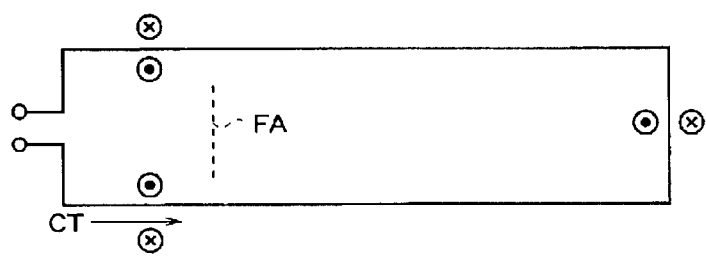
FIG. 2 is a plane view illustrating a schematic configuration of a prior art loop antenna.

The reason is not necessarily fully figured out why the communication with the antenna coil having a perpendicular antenna plane with respect to the product shelf loop antenna, which was difficult with a conventional loop antenna shown in FIG. 2, was made possible with a loop antenna 10 of this embodiment, however, it is conceivable that the reason is as follows: In FIG. 2, almost no magnetic flux crosses the antenna plane of an antenna coil FA which exists perpendicularly above the paper surface and is shown by dashed lines in FIG. 1 and FIG. 2 (i.e. there is no current which generates crossing magnetic flux in the vicinity of the antenna coil FA). On the other hand in FIG. 1, because a magnetic flux MG 1 which is generated obeying the right-handed screw rule in the shown state has a component in the X direction, the magnetic field of the loop antenna 10 crosses the antenna coil FA.

Needless to say, it should be understood that, by using the loop antenna 10 of this embodiment, the wireless communication with the IC tag card which includes a film antenna coil having an antenna plane parallel or oblique with respect to the antenna plane AS can be done.

As described above, since wireless communications can be done with the antenna coil (FA) having an antenna plane perpendicular with respect to the antenna plane (AS) of the loop antenna (10) as well as an antenna plane parallel or oblique with respect to the antenna plane (AS), in accordance with this embodiment, restrictions on the directions of placing the mutually facing antennas (10 and FA in this example) are less and thus a higher flexibility is attained than with the prior art.

Therefore, it is possible to attach an IC tag card on any face of a case surface even in the case of a cube having a small size in length, width and height, for example, a case wrapping a CD product, and also it is possible to place the case in any direction when it is placed on a product shelf.

In other words, this embodiment improves the reliability of communication such that wireless communications can be done even with the antenna coil (FA) having a perpendicular antenna plane, which was difficult in the prior art.

(B) Second Embodiment

Only the points that differ from those of the first embodiment will be described below.

(B-1) Configuration and Operation of the Second Embodiment

Figure 3:
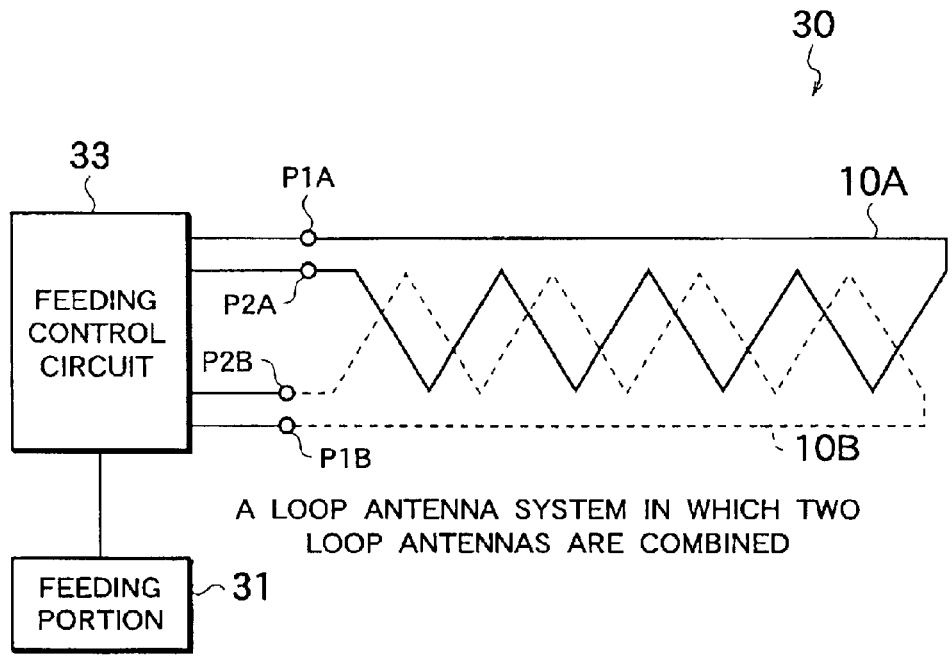
FIG. 3 is a schematic diagram illustrating a configuration example of the main portion of a loop antenna system according to the second embodiment of the present invention.

A configuration example of the main part of a loop antenna system 30 of this embodiment is shown in FIG. 3.

In FIG. 3, the loop antenna system 30 comprises loop antennas 10A and 10B, a feeding portion 31 and a feeding control circuit 33.

The loop antennas 10A and 10B are similar ones as the loop antenna 10 of the first embodiment. As can be seen in FIG. 3, these two loop antennas 10A and 10B are so placed that they are staggered within a same plane such that the point of the acute angle portions TG1–TG4 do not overlap each other and the antenna plane of the loop antenna 10A and the antenna plane of the loop antenna 10B are substantially common.

The feeding portion 31 is connected to feeding points, P1A and P2A, of the loop antenna 10A and to feeding points, P1B and P2B, of the loop antenna 10B through the feeding control circuit 33. By the feeding control circuit 33, the time of the feedings from the feeding portion 31 to the loop antenna 10A and loop antenna 10B can be staggered not to overlap.

Therefore, according to this embodiment, the feeding to the loop antenna 10A and the feeding to the loop antenna 10B are implemented alternatively, thus the loop antennas 10A and 10B become effective alternatively.

With this configuration, by using two loop antennas 10A and 10B, it can be easier to observe the regulations about antenna sizes and outputs defined by the Radio Law, and also the reliability of communication can be increased comparing to that of the first embodiment.

Making two loop antennas 10A and 10B effective alternatively is equivalent to the fact that only one loop antenna exists at the same time, therefore, it is obvious that this makes easier to observe the regulations about antenna sizes and outputs defined by the Radio Law than the case where two antennas are made effective at the same time.

In addition, although the reason is not necessarily clarified why the reliability of communication of the second embodiment can be higher than that of the first embodiment, it is highly likely that, in the first embodiment, the magnetic flux densities are spatially non-uniform due to the mutual interference of the magnetic field generated from each portions of the loop antenna 10, whereas, in the second embodiment, the magnetic flux densities are uniformized and also maintained at high level, which may lead to a higher reliability.

More particularly, it is conceivable that the reason is as follows: If the magnetic flux densities are spatially non-uniform, normal communication can be done in a high density area but often cannot be done in a low density area. On the other hand, in the case where two loop antennas 10A and 10B having same shapes are placed such that they are staggered, the area where the magnetic flux density by one loop antenna (e.g. 10A) is low can be matched to the area where the magnetic flux density by the other loop antenna (e.g. 10B) is high, and thereby the magnetic flux densities can be mutually complemented and thus the magnetic flux densities in the space vicinity of the loop antennas 10A and 10B can be kept high in their entirety.

As described above, according to the second embodiment, the equivalent effects to the effects of the first embodiment can be attained.

In addition, in the second embodiment, the reliability of communication can be higher than the first embodiment, if the conditions such as outputs are identical.

EXAMPLE 1

A test was conducted with an experimentally manufactured loop antenna 10 according to the first embodiment.

A loop antenna of the shape shown in FIG. 1 was formed by using a surface-coated copper wire 2 mm in diameter as a linear conductor. The long straight line portion LP was 125 cm, the short straight line portions TP1 and TP2 were both 30 cm, the angles θ1, θ2, and θ3 were all 60 degrees.

This loop antenna was placed on a surface of a 1-cm thick wooden product shelf board, and then it was covered with a 2-mm thick foam polystyrene sheet, and feeding points of both ends of loop antenna were connected to a feeding device.

Then, 50 CD cases, to the side face of each CD case the aforementioned IC tag was attached as shown in FIG. 4, were arranged at random positions on the foam polystyrene sheet on the product shelf board, and 1 W power was fed to the loop antenna, and a test was conducted for reading the information stored in the IC of the each IC tag. The result was that 48 of them were read out. Moreover, the two, which were not read out, were also read out when they were moved 3 cm in parallel in the X direction in FIG. 1 on the surface of the expanded polystyrene sheet.

Details of the IC tag used in this test are described below.

The antenna coil was formed by attaching a 35-$\mu$m thick copper film to one surface of a 50-$\mu$m thick polyethylene terephthalate film manufactured by Toyobo Co., Ltd., product name, "PETA-4300", and then implementing wet etching using ferric chloride solution. The number of turns of the antenna coil was 9, the long side of the antenna coil was 45 mm, and the short side was 16 mm. The IC tag was formed by mounting an IC chip manufactured by Philips Japan Ltd., product name, "I-CODE", on the antenna coil. 50 IC tags same as this were manufactured and information was stored in each IC tag.

In addition, the feeding device used herein was manufactured by Marantz Japan Inc., product name, "ICW900F". This feeding device also has the function of the feeding control circuit 33 described in the second embodiment.

The experimental example and the reading test hereinabove assured the validity of the first embodiment.

EXAMPLE 2

A test was conducted with an experimentally manufactured loop antenna system 30 according to the second embodiment.

Two loop antennas same as in the Example 1 were prepared, and placed on the back surface of a 1-cm thick wooden product shelf board such that the loop antennas were staggered and the point of the acute angle portions TG1–TG4 did not overlap each other, as shown in FIG. 3.

50 CD cases, to each of which same IC tag as in the Example 1 was attached, were arranged on the surface of the wooden product shelf board at random positions, then a reading test was conducted. The result was that all 50 of them were read out.

The experimental example and the reading test hereinabove assured the validity of the second embodiment, and a higher reliability than that of the first embodiment.

Moreover, although the loop antennas 10, 10A and 10B each having sawtooth-shape were used in the aforementioned first and second embodiments as mentioned above, the loop antenna of the present invention is not limited to this shape.

For example, the aforementioned long line portion LP can be bent as same as the acute angle portions TG1–TG4, and the acute angle portions TG1–TG4 can be bent at right angles or bent smoothly in a sinusoidal waveform instead of being bent at acute angles.

In addition, although the number of turns of the loop antenna 10 was one in the first embodiment, it can be two or more.

Further in addition, the two loop antennas 10A and 10B were made effective alternatively in the second embodiment, more than three loop antennas can be made effective such that they are staggered in terms of time.

Moreover, although the loop antennas (10A and 10B) to be combined had same shapes, they can have different shapes.

Needless to say, this invention can be applicable to applications other than inventory control of the product such as video products or CD product mentioned above.

As described above, according to the present invention, the reliability of communication can be increased, and the flexibility in such as the placing directions of facing antennas can be increased.

What is claimed is:

1. A wireless communication system, comprising:

an elongated planar loop antenna having an input at one end, one side conductor extending substantially linearly on one side of the loop from the input throughout the length of the loop antenna and an opposite side conductor which is bent to form a plurality of concavo-convex portions toward and away from the one side conductor from the input throughout the length of the loop antenna within the plane of the loop antenna; and an antenna coil whose antenna plane is facing perpendicularly with respect to the antenna plane of said loop antenna;

wherein wireless communication is implemented between said loop antenna and said antenna coil by way of an inductive electromagnetic field.

2. A wireless communication system, comprising:

a loop antenna system having a plurality of elongated planar loop antenna, each loop antenna having an input at one end, one side conductor extending substantially linearly on one side of the loop from the input throughout the length of the loop antenna and an opposite side conductor which is bent to form a plurality of concavo-convex portions toward and away from the one side conductor from the input throughout the length of the loop antenna within the plane of the loop antenna, and each loop antenna being placed within a same antenna plane and being placed such that the concavo-convex portions are staggered within the antenna plane; and an antenna coil whose antenna plane is facing perpendicularly with respect to the antenna plane of said loop antenna system;

wherein wireless communication is implemented between said loop antenna system and said antenna coil by way of an inductive electromagnetic field.

3. A wireless communication system, comprising:

a loop antenna system having a plurality of elongated planar loop antenna, each loop antenna having an input at one end, one side conductor extending substantially linearly on one side of the loop from the input throughout the length of the loop antenna and an opposite side conductor which is bent to form a plurality of concavo-convex portions toward and away from the one side conductor from the input throughout the length of the loop antenna within the plane of the loop antenna, and each loop antenna being placed within a same antenna plane and being placed such that the concavo-convex portions are staggered within the antenna plane, and said loop antenna system having a feed control means for implementing the feedings to each loop antenna such that the feedings do not overlap in terms of time; and an antenna coil whose antenna plane is facing perpendicularly with respect to the antenna plane of said loop antenna system;

wherein wireless communication is implemented between said loop antenna system and said antenna coil by way of an inductive electromagnetic field.

* * * * *